United States Patent
Arai

(10) Patent No.: US 10,469,761 B2
(45) Date of Patent: Nov. 5, 2019

(54) IMAGE CAPTURING APPARATUS

(71) Applicant: Olympus Corporation, Hachioji-shi, Tokyo (JP)

(72) Inventor: Hirozumi Arai, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/924,139

(22) Filed: Mar. 16, 2018

(65) Prior Publication Data
US 2018/0309920 A1 Oct. 25, 2018

(30) Foreign Application Priority Data

Apr. 25, 2017 (JP) ................................ 2017-086068

(51) Int. Cl.
| | | |
|---|---|---|
| *H04N 5/235* | (2006.01) | |
| *H04N 5/232* | (2006.01) | |
| *H04N 5/243* | (2006.01) | |
| *H04N 9/69* | (2006.01) | |

(52) U.S. Cl.
CPC ......... *H04N 5/2353* (2013.01); *H04N 5/2356* (2013.01); *H04N 5/23293* (2013.01); *H04N 5/243* (2013.01); *H04N 9/69* (2013.01)

(58) Field of Classification Search
None
See application file for complete search history.

(56) References Cited

U.S. PATENT DOCUMENTS

| | | | | |
|---|---|---|---|---|
| 7,020,331 | B2 * | 3/2006 | Saikawa | .................. H04N 1/60 348/223.1 |
| 2008/0204565 | A1 * | 8/2008 | Yumiki | .............. H04N 5/23219 348/208.99 |

FOREIGN PATENT DOCUMENTS

| | | |
|---|---|---|
| JP | 2005-318100 | 11/2005 |
| JP | 2013-038591 | 2/2013 |

* cited by examiner

*Primary Examiner* — Mark T Monk
(74) *Attorney, Agent, or Firm* — John C. Pokotylo; Pokotylo Patent Services

(57) ABSTRACT

An image capturing apparatus includes: an image capturing section that outputs first captured-image data obtained by capturing an image at a relatively low ISO speed, and second captured-image data obtained by capturing an image at an ISO speed higher than the ISO speed for the first captured-image data; a color analysis circuit that analyzes a display color included in a display image of the first captured-image data; a color correction instructing circuit that gives an instruction to correct a display color of the second captured-image data according to a result of the analysis; and an image generation circuit that corrects the display color of the second captured-image data so as to generate an image to be displayed.

14 Claims, 14 Drawing Sheets

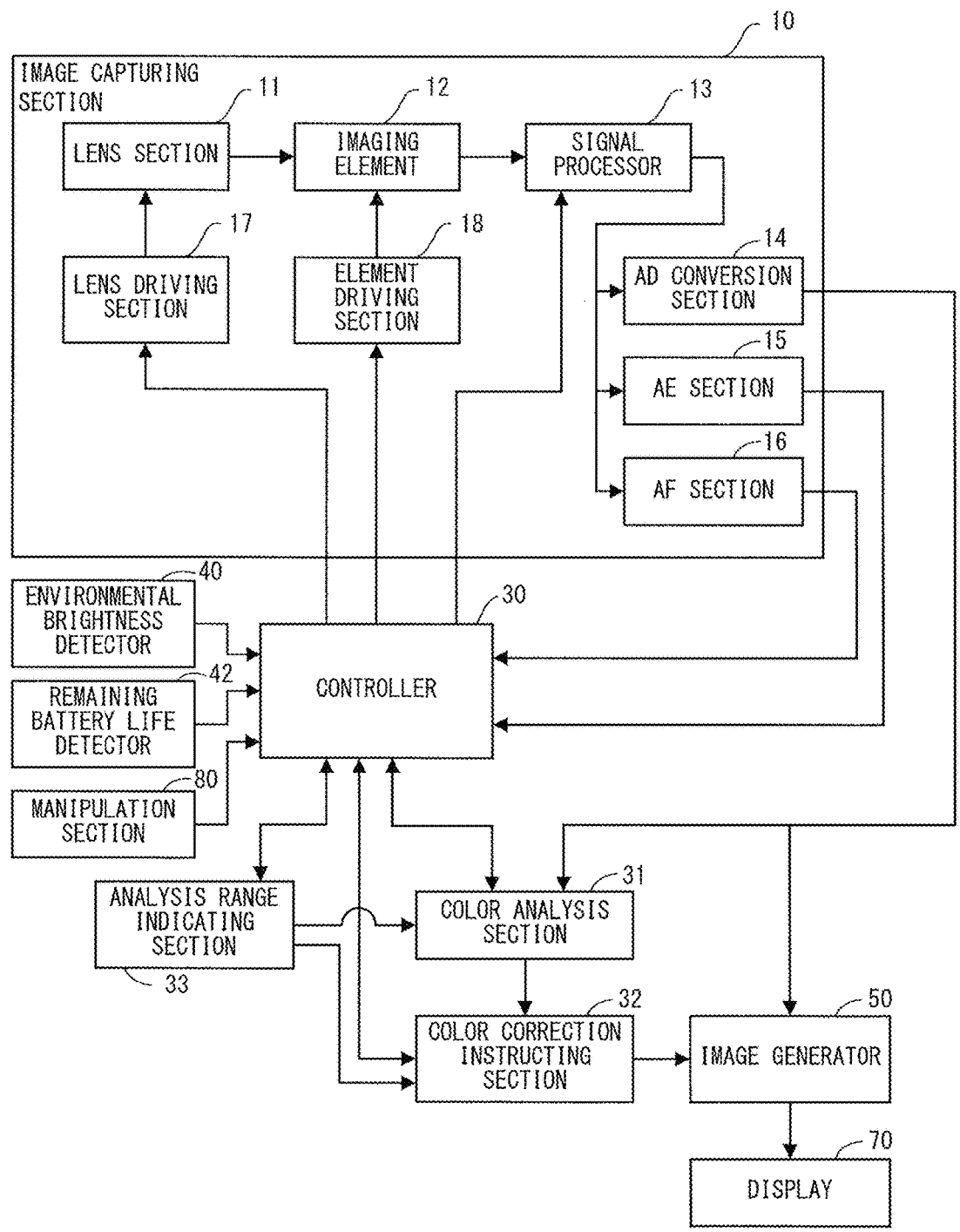
F I G. 3

D1
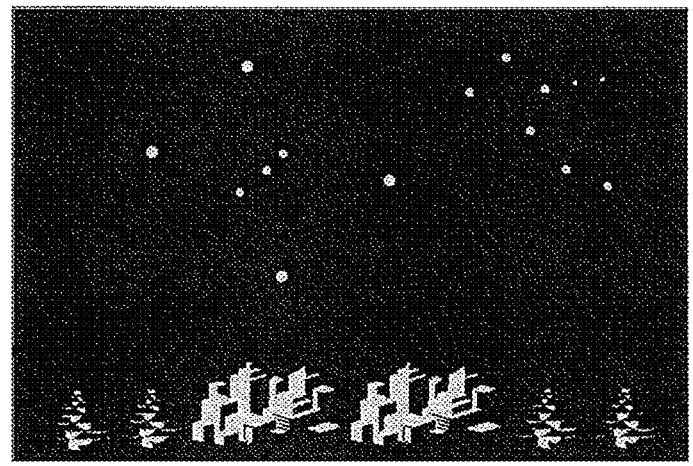
D2 COLOR NOISE
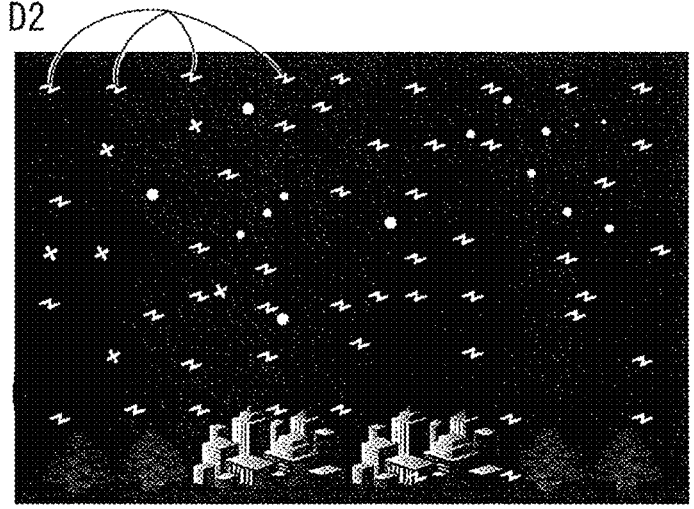
FIG. 4

HUE DIAGRAM
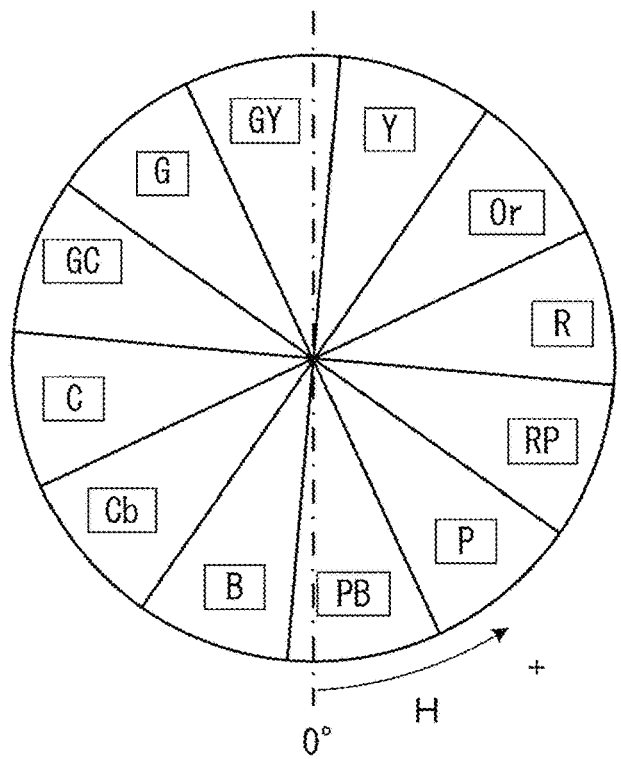
T1
| COLOR | H RANGE |
|---|---|
| Y | 145~174 |
| Or | 115~144 |
| R | 85~114 |
| RP | 55~84 |
| P | 25~54 |
| PB | 0~24, 355~360 |
| B | 325~354 |
| CB | 295~324 |
| C | 265~294 |
| GC | 235~264 |
| G | 205~234 |
| GY | 175~204 |
F I G. 5

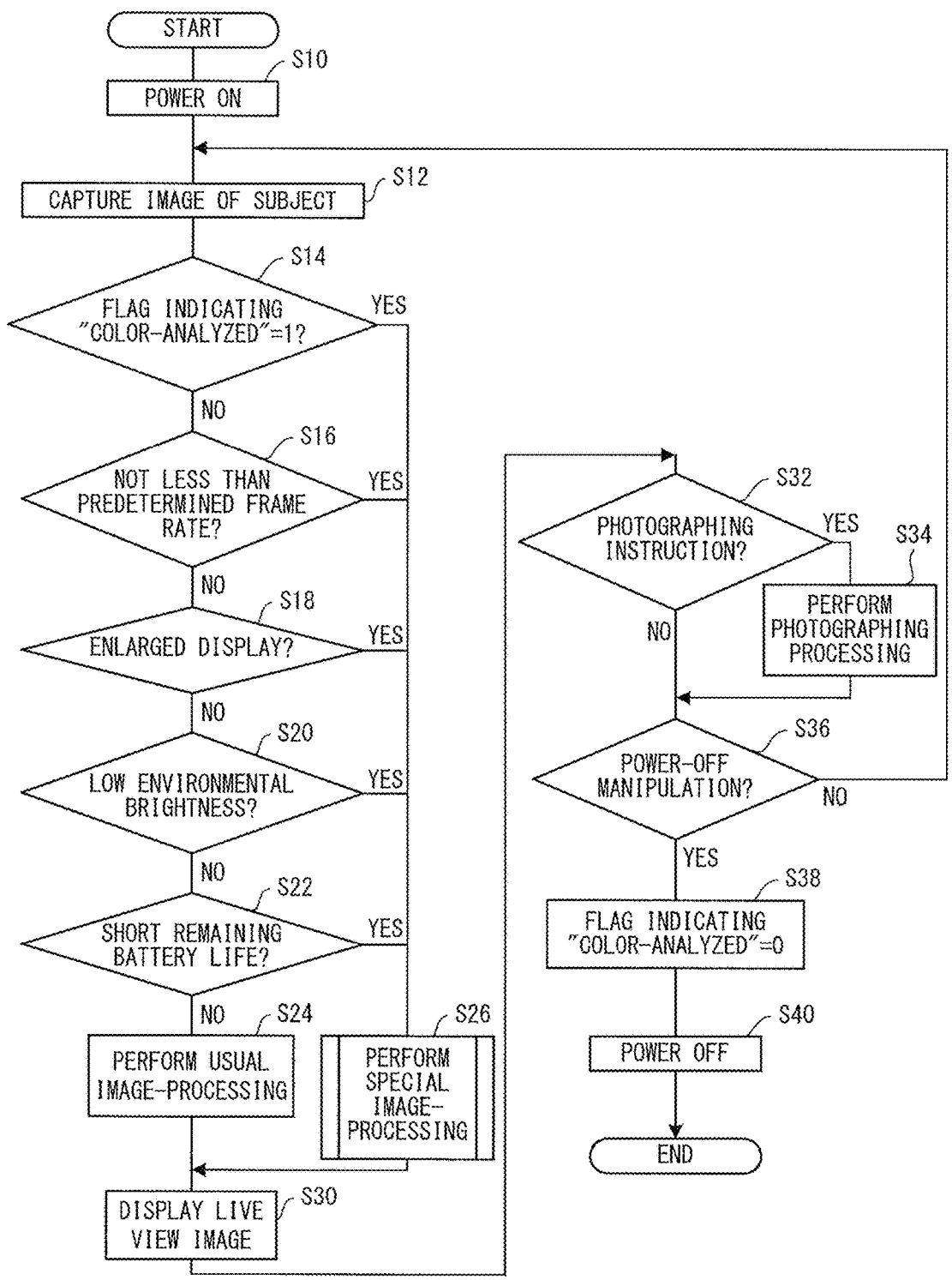
F I G. 7

N1 HIGH ISO SPEED IMAGE
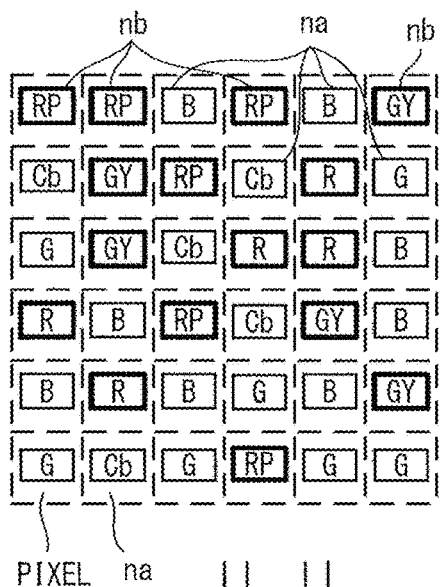
N2 AFTER CORRECTION PROCESSING (SATURATION DECREASE)
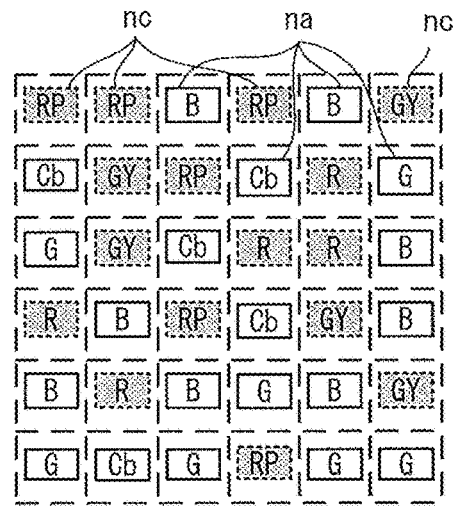
N3 AFTER CORRECTION PROCESSING (CONVERSION INTO GREY)
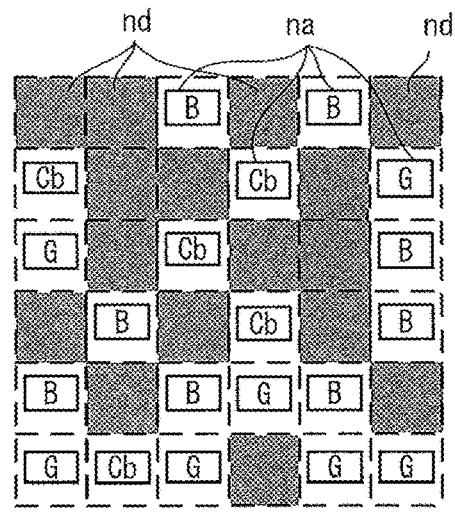
N4 AFTER CORRECTION PROCESSING (REPLACEMENT)
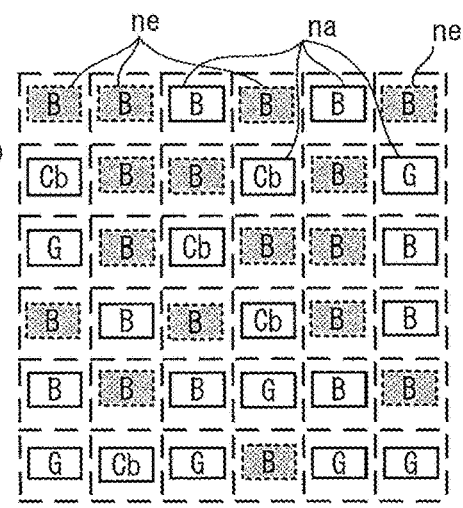
F I G. 1 1

D10
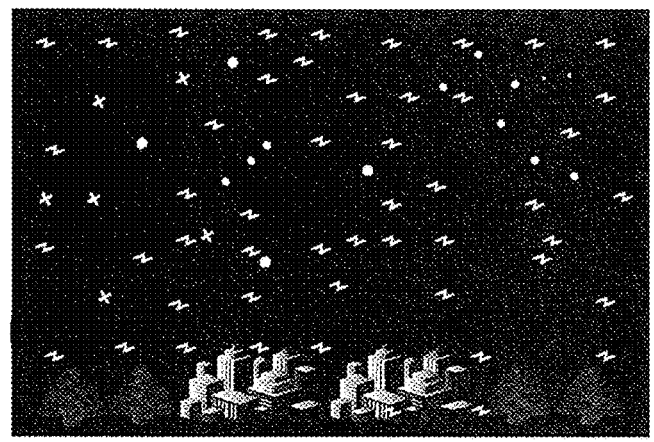
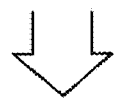
D11
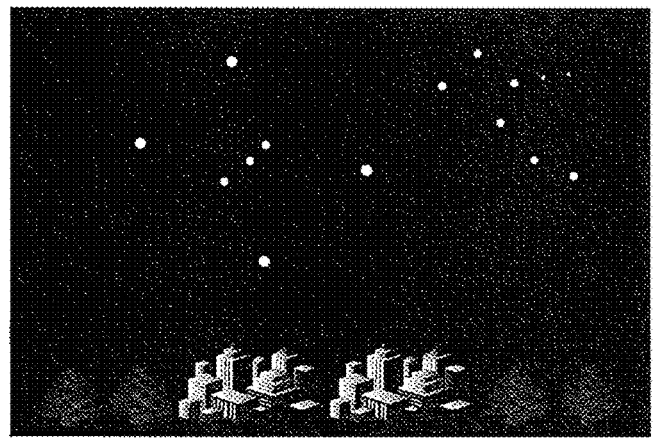
T5
| NOISE | HUE |
|---|---|
| ● | RP |
| ● | GY |
| ● | R |
FIG. 12

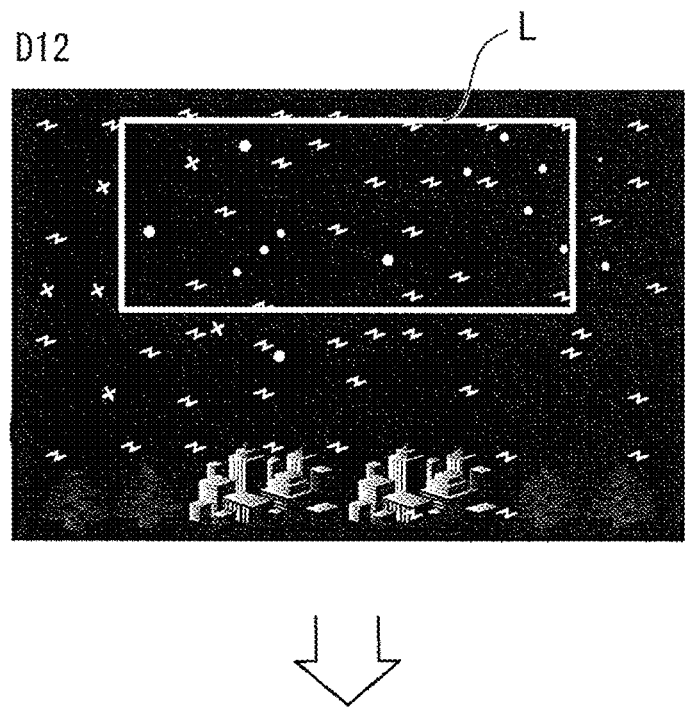
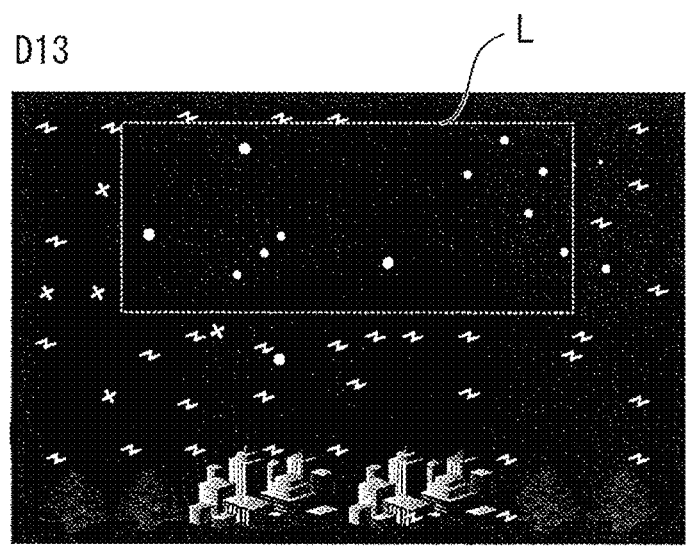
FIG. 13

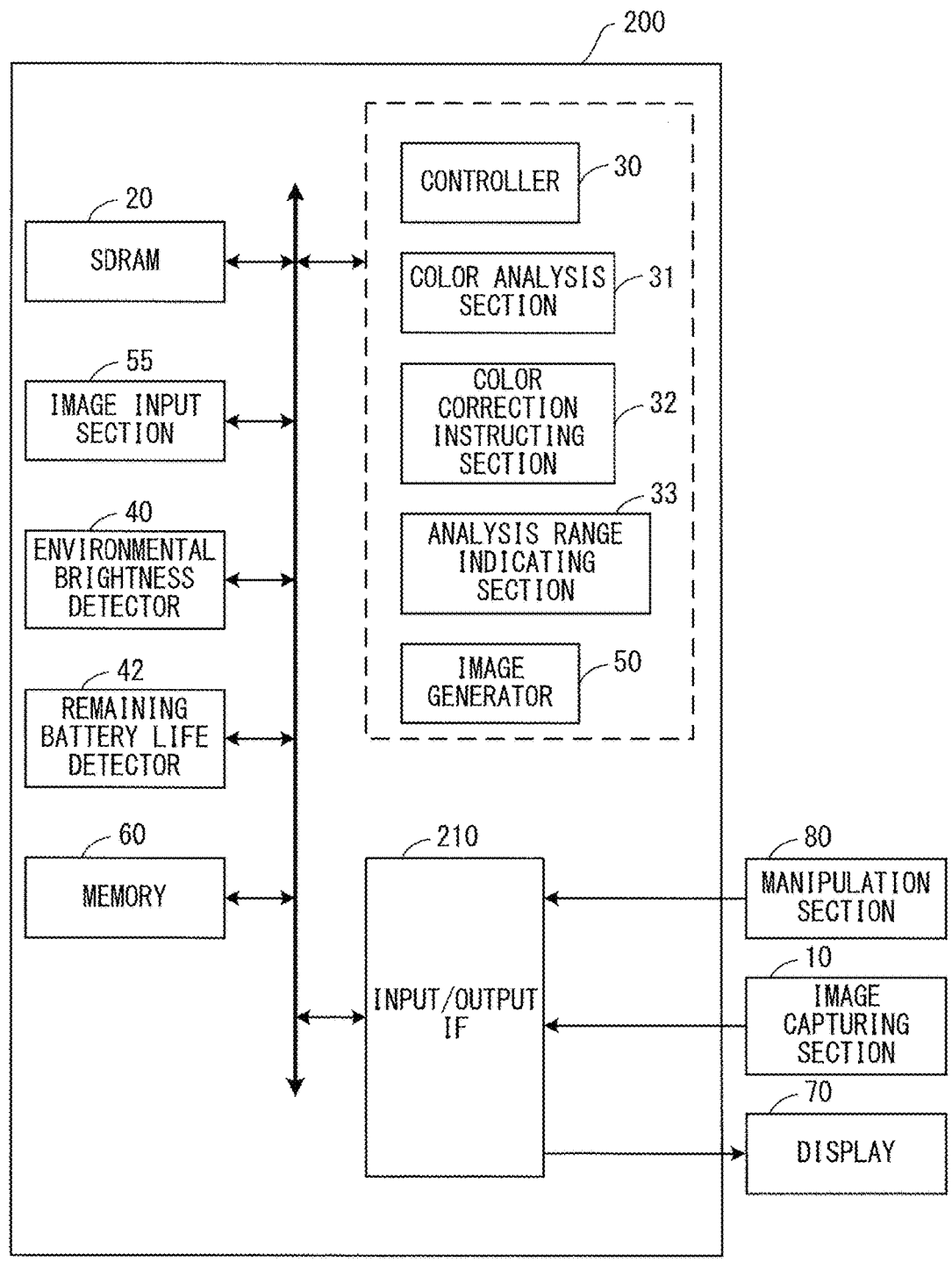
F I G. 1 4

IMAGE CAPTURING APPARATUS

CROSS-REFERENCE TO RELATED APPLICATIONS

This application is based upon and claims the benefit of priority of the prior Japanese Patent Application No. 2017-086068, filed on Apr. 25, 2017, the entire contents of which are incorporated herein by reference.

BACKGROUND OF THE INVENTION

Field of the Invention

The present invention relates to an image capturing apparatus that can easily perform framing even when photographing is performed in a dark place.

Description of the Related Art

When astrophotographing is performed at night or when photographing is performed in a dark place, a display image (a live view image) is dark at a usual frame rate, so the frame rate is decreased in order to display a bright image. However, the time lag between live view images becomes large if the frame rate is decreased, which results in difficulty in performing framing. On the other hand, the ISO speed is also increased with an increase in the frame rate, so an image with much noise may be displayed, depending on a scene. For example, Patent Documents 1 and 2 have proposed a method for changing an image to black-and-white or to a binarized image when photographing is performed in a dark place.

Patent Document 1: Japanese Laid-open Patent Publication No. 2005-318100
Patent Document 2: Japanese Laid-open Patent Publication No. 2013-38591

SUMMARY OF THE INVENTION

An image capturing apparatus according to embodiments of the present invention includes: an image capturing section that performs special image-processing that includes performing photographing twice at different ISO speeds and outputting first captured-image data obtained by capturing an image at a relatively low ISO speed, and second captured-image data obtained by capturing an image at an ISO speed higher than the ISO speed for the first captured-image data; a color analysis circuit that analyzes a display color included in a display image of the first captured-image data; a color correction instructing circuit that gives an instruction to correct a display color of the second captured-image data according to a result of the analysis performed by the color analysis circuit; an image generation circuit that corrects the display color of the second captured-image data according to the correction instruction given by the color correction instructing circuit, so as to generate an image to be displayed that is based on the second captured-image data; and a display that displays the image to be displayed that has been generated by the correction performed by the image generation circuit.

BRIEF DESCRIPTION OF THE DRAWINGS

FIG. 3 is a functional block diagram that illustrates a configuration of an image capturing section and special image-processing in detail;

FIG. 4 illustrates examples of live view images captured in a low illumination condition;

FIG. 5 is a diagram for explaining an HS plane in an HSV color space;

FIG. 7 is a flowchart that illustrates a procedure of special image-processing when photographing is performed in a low illumination condition;

FIG. 11 is a diagram for explaining a pixel correction performed by an image generator;

FIG. 12 is a diagram for explaining an effect of special image-processing performed on a live view image;

FIG. 13 illustrates screens on which an analysis range is indicated; and

FIG. 14 illustrates a configuration of an image processing apparatus that performs special image-processing.

DETAILED DESCRIPTION OF THE PREFERRED EMBODIMENTS

Figure 1:
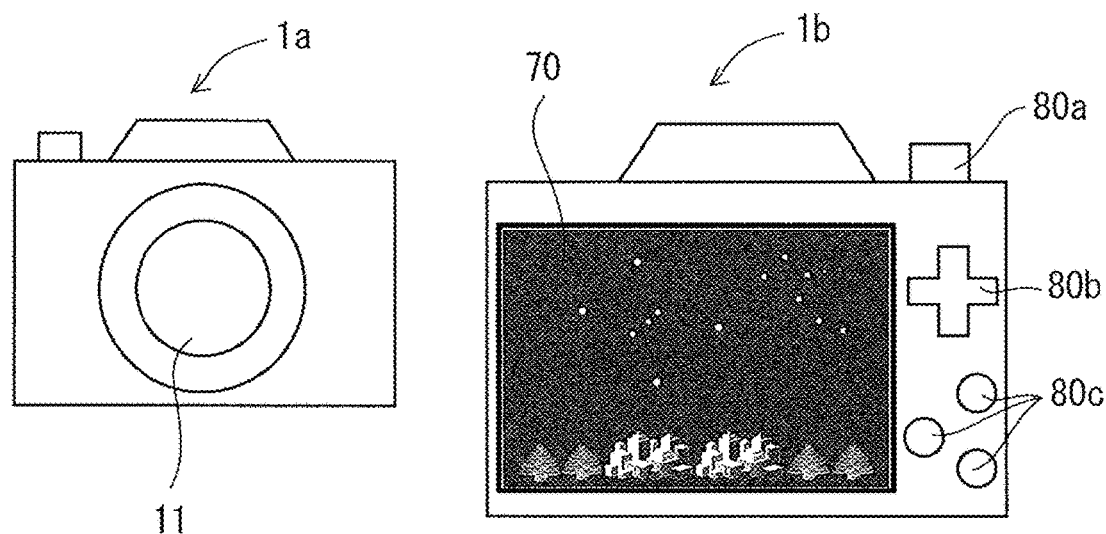
FIG. 1 is an external view of an image capturing apparatus according to an embodiment of the present invention.

Embodiments of the present invention will now be described with reference to the drawings. FIG. 1 is an external view of an image capturing apparatus 1 according to an embodiment of the present invention. FIG. 1 illustrates a so-called digital camera as an example of the image capturing apparatus 1, but of course the image capturing apparatus 1 may be a camera built into, for example, a smartphone or a portable device.

An image capturing apparatus 1a is a front of the image capturing apparatus 1. An image capturing apparatus 1b is a back of the image capturing apparatus 1. The image capturing apparatus 1 includes a lens section 11 of an image capturing section 10 in the center of its front surface. The image capturing apparatus 1 includes a display 70 and a manipulation section 80 on its back surface. The manipulation section 80 includes a release button 80a, an orientation instruction button 80b, and a manipulation button 80c.

Figure 2:
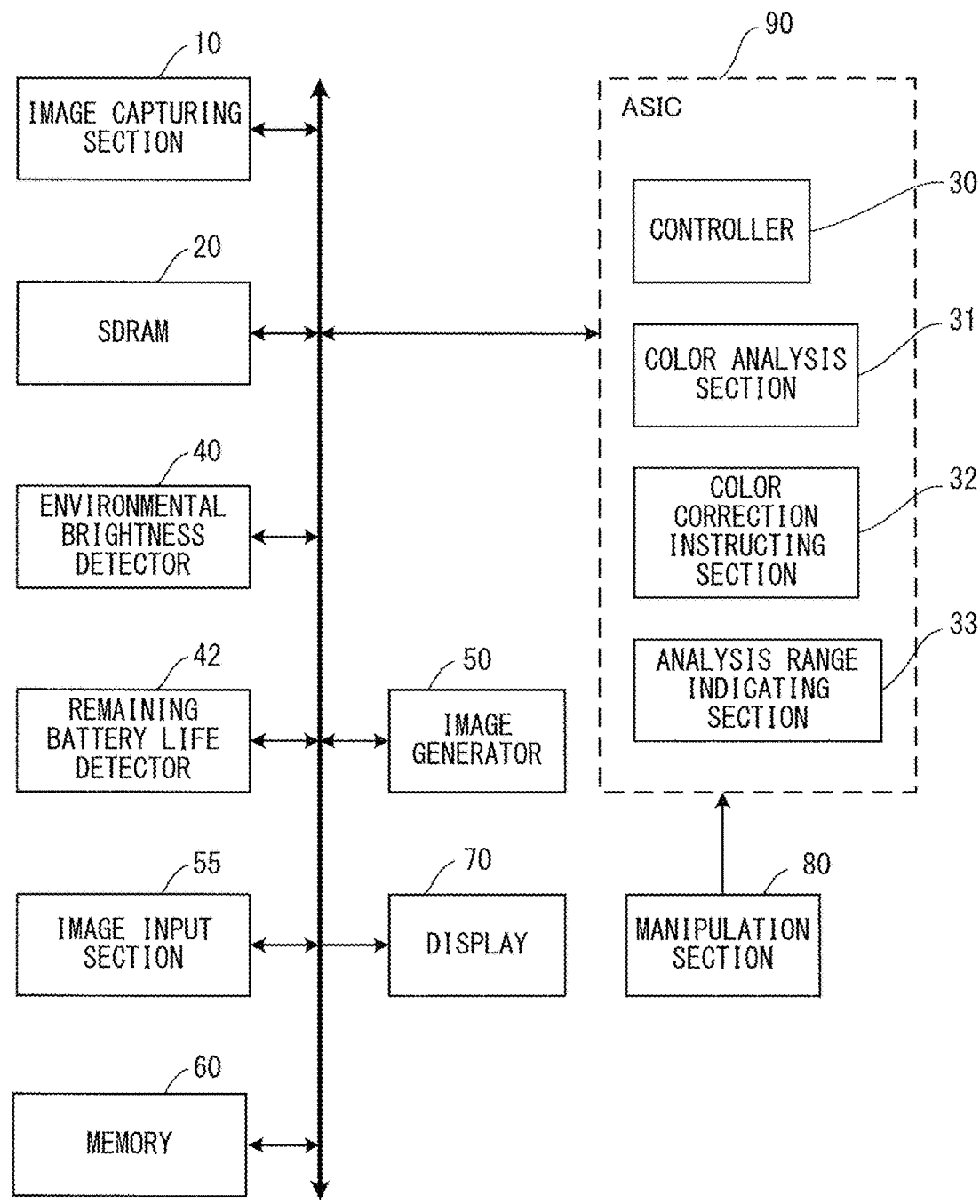
FIG. 2 is a functional block diagram that illustrates a configuration of the image capturing apparatus.

FIG. 2 is a functional block diagram that illustrates an example of a configuration of the image capturing apparatus 1. The image capturing apparatus 1 includes the image capturing section 10, a synchronous dynamic random access memory (SDRAM) 20, a controller 30, an environmental brightness detector 40, a remaining battery life detector 42, an image generator 50, an image input section 55, a memory 60, the display 70, and the manipulation section 80.

The image capturing section 10 captures an image of a subject and outputs captured-image data. The image capturing section 10 will be described in detail later with reference to FIG. 3. The SDRAM 20 temporarily stores various data such as captured-image data. The controller 30 performs an overall control of the entire image capturing apparatus 1. The environmental brightness detector 40 detects a brightness in an environment in which photographing is performed. The remaining battery life detector 42 detects a remaining life of a battery (not illustrated) for driving the image capturing apparatus 1.

On the basis of captured-image data, the image generator 50 generates a live view image (also referred to as a display image) that is displayed on the display 70, or a still image that is saved and stored in the memory 60. The image generator 50 performs image processing such as an interpolation process, a white balance process, and a color conversion process that converts RGB data in an imaging element 12 into YC data. Further, the image generator 50 includes a noise reduction processor (not illustrated). Furthermore, the image generator 50 performs a color noise correction according to a color correction instruction given by a color correction instructing section 32 described later, so as to generate a live view image. The image generator 50 is also referred to as an image generation circuit.

The image input section 55 inputs captured-image data stored in the memory 60. Alternatively, the image input section 55 may input captured-image data from the outside of the image capturing apparatus 1 using a communication device (not illustrated). The memory 60 is a nonvolatile memory and stores data of an image captured by the image capturing section 10. The memory 60 is, for example, a flash memory, and may be removable.

The display 70 displays, for example, a live view image generated by the image generator 50, a still image or a video that is stored in the memory 60, and photographing information or a photographing guide. The display 70 is an LCD or an organic EL display. The manipulation section 80 is an input section used by a photographer to input an instruction. The manipulation section 80 includes the release button 80a, the orientation instruction button 80b, and the manipulation button 80c.

The image capturing apparatus 1 further includes a color analysis section 31, the color correction instructing section 32, and an analysis range indicating section 33. The color analysis section 31, the color correction instructing section 32, and the analysis range indicating section 33 are used to perform special image-processing described later. The special image-processing is processing of correcting a noise color in a high ISO speed image.

The color analysis section 31 analyzes a display color included in a live view image displayed using captured-image data. In the following descriptions, a "color in captured-image data" indicates a color (display color) in a live view image obtained by the image generator 50 performing a color conversion on the captured-image data, not a color of each pixel in an imaging element. In other words, the "color in captured-image data" is also referred to as a color in a live view image based on captured-image data. The color analysis section 31 is also referred to as a color analysis circuit.

According to a result of analysis performed by the color analysis section 31, the color correction instructing section instructs the image generator 50 to perform a color correction. The analysis range indicating section 33 indicates an analysis range, on a screen of a captured image, in which analysis is to be performed by the color analysis section 31. The controller 30, the color analysis section 31, the color correction instructing section 32, and the analysis range indicating section 33 are included in an application specific integrated circuit (ASIC) 90. The color correction instructing section 32 is also referred to as a color correction instructing circuit. The analysis range indicating section 33 is also referred to as an analysis range indicating circuit.

FIG. 3 is a functional block diagram that illustrates a configuration of the image capturing section 10 and special image-processing in detail. The image capturing section 10 includes, for example, the lens section 11, the imaging element 12, a signal processor 13, an analog-to-digital (AD) conversion section 14, an automatic exposure (AE) section 15, an automatic focus (AF) section 16, a lens driving section 17, and an element driving section 18. The lens section 11 forms an image of a subject in the imaging element 12. The imaging element 12 is configured by, for example, a CCD or a CMOS, and optoelectrically converts the formed image of the subject.

The signal processor 13 includes a correlated double sampling (CDS) circuit (not illustrated) and an automatic gain control (AGC) circuit (not illustrated), and amplifies an electric signal from the imaging element 12 at a set ISO speed. The AD conversion section 14 converts an image signal output from the signal processor 13 into captured-image data and outputs the captured-image data.

The AE section 15 performs photometry according to an image signal, calculates a brightness value (BV) of a subject, refers to, for example, a program diagram, and sets, for example, an ISO speed, a shutter speed, and a stop value. The AE section 15 reports the set values such as the ISO speed to the controller 30. The AF section 16 detects a focal position according to an image signal and reports the focal position to the controller 30.

The lens driving section 17 drives a motor of an AF lens (not illustrated) or a zoom lens (not illustrated) included in the lens section 11. The lens driving section 17 drives an actuator for a shutter or a stop of the lens section 11, and adjusts a shutter speed or a stop value. The lens driving section 17 is controlled by the controller 30. The element driving section 18 drives the imaging element 12 at a predetermined frame rate according to an instruction given by the controller 30.

The controller 30 adjusts a gain of the signal processor 13 according to the ISO speed set by the AE section 15. The controller 30 may adjust both the gain of the signal processor 13 and a gain of the AD conversion section 14 according to the set ISO speed.

The controller 30 controls the lens driving section 17 according to, for example, the set shutter speed or the set stop value, so as to adjust, for example, a shutter speed or a stop value. Further, the controller 30 sets a predetermined frame rate according to a brightness value of a subject detected by the AE section 15 and controls the element driving section 18 so as to drive the imaging element 12 at the predetermined frame rate. Image processing is performed by the image generator 50 on captured-image data output from the AD conversion section 14, and the captured-image data is displayed on the display 70 as a live view image.

The controller 30 selectively performs at least two processes, special image-processing and usual image-processing, as captured-image processing to display a live view image. The special image-processing is processing that includes determining a noise color from a difference in display color between two images that are an image captured at a low ISO speed (a low ISO speed image) and an image captured at a high ISO speed (a high ISO speed image), correcting, in the high ISO speed image, the color that has been determined to be noise, and displaying the high ISO speed image as a live view image. The usual image-processing is processing performed without performing special image-processing.

There are various methods for correcting a color determined to be noise. Here, three examples are described. A first correction method is a method for decreasing a saturation of a noise color (hereinafter also referred to as a saturation decrease). A second correction method is a method for converting a noise color into grey (hereinafter also referred to as a conversion into grey). A third correction method is a method for replacing a noise color with a color in a low ISO speed image (hereinafter referred to as replacement). These three specific examples will be described later with reference to FIG. 11. It is possible to reduce color noise in a live view image by performing special image-processing. The color analysis section 31, the color correction instructing section 32, and the analysis range indicating section 33 determine a noise color.

The controller 30 performs special image-processing when a predetermined condition is satisfied. For example, the controller 30 performs the special image-processing when the environmental brightness detector 40 detects that photographing is performed in a dark environment or when an amount of a remaining battery life detected by the remaining battery life detector 42 becomes smaller than a preset value. In addition, the controller 30 performs the special image-processing when a specific condition is set or indicated using the manipulation section 80.

Here, noise that occurs when photographing is performed in a low illumination condition (photographing in a dark place or at night) is described. It is preferable that a live view image be displayed at a normal frame rate (for example, 30 fps) even in a low illumination condition. The reason is that, if the frame rate is decreased, it will become difficult to perform framing due to the occurrence of a time lag. However, the shutter speed will not become low if a live view image is displayed at the normal frame rate, which results in an increase in the ISO speed. Thus, conventionally, noise, specifically color noise, occurs in a live view image when photographing is performed in a low illumination condition.

FIG. 4 illustrates examples of live view images when astrophotographing is performed at night. An image D1 in FIG. 4 is an example of a live view image displayed at a low frame rate (for example, 1 fps). Displaying at a low frame rate makes it possible to suppress an increase in the ISO speed. This also results in suppressing the occurrence of color noise.

An image D2 in FIG. 4 is an example of a live view image displayed at a normal frame rate (for example, 30 fps). There occurs much noise in a live view image because it is displayed at a normal frame rate and the ISO speed is then increased. The noise is random noise that varies for each frame while flickering, and is primarily seen as color components. This noise is hereinafter referred to as color noise. It is difficult to distinguish color noise from stars in a live view image such as the image D2, with the result that a photographer has difficulty in performing framing properly.

Thus, the following processing is performed as special image-processing. First, the image capturing section 1 performs photographing twice at different ISO speeds by being controlled by the controller 30. Two pieces of image-captured data that are first image-captured data and second image-captured data are obtained. Next, the controller 30 outputs the first captured-image data and the second captured-image data from the image capturing section 10. Then, the color analysis section 31 analyzes a color included in the first captured-image data by being controlled by the controller 30.

Here, an example of a hue (H) analysis performed by the color analysis section 31 is briefly described. FIG. 5 is a diagram for explaining an HS plane in an HSV color space. A hue diagram in FIG. 5 is an example of an HS plane in an HSV color space, and indicates a hue (H) range. The hue (H) is defined in a circumferential direction, and the saturation (S) is defined in a radial direction. As indicated in the hue diagram, H is defined by a counterclockwise angle, with the downward y-axis being 0° (a starting point). The hue diagram is an example in which hues are classified into twelve colors in total, including PB (purple blue), P (purple), RP (red purple), R (red), Or (orange), Y (yellow), GY (yellow green), G (green), GC (blue green), C (cyan), Cb (green blue), and B (blue). A table T1 in FIG. 5 includes an H range (angle) for each hue (12 colors) in the hue diagram.

When data of each pixel is in the RGB format, the color analysis section 31 calculates the H of each pixel in image data using the following formulas, so as to obtain a hue (H).

When the maximum value among R, G, and B is MAX and the minimum value among R, G, and B is MIN, $H=0$ when MIN=MAX $H=(60\times(G-R)/(MAX-MIN))+60$ when MIN=$B$ $H=(60\times(B-G)/(MAX-MIN))+180$ when MIN=$R$ $H=(60\times(R-B)/(MAX-MIN))+300$ when MIN=$G$ The hue (H) is hereinafter also referred to as color for simplification.

The color analysis section 31 analyzes display colors in a low ISO speed image (first captured-image data) and display colors in a high ISO speed image (second captured-image data) by being controlled by the controller 30. Then, the color analysis section 31 determines, as a specific color, a display color in the high ISO speed image that is not included in the low ISO speed image. The specific color is a color determined to be noise. The color correction instructing section 32 gives an instruction to correct the specific color in the second captured-image data (a saturation decrease, a conversion into grey, or replacement) according to a result of the analysis performed by the color analysis section 31.

The image generator 50 corrects the second captured-image data according to the correction instruction given by the color correction instructing section 32 so as to generate a corrected image, by being controlled by the controller 30. The display 70 displays the corrected image generated by the image generator 50 by being controlled by the controller 30.

Figure 6:
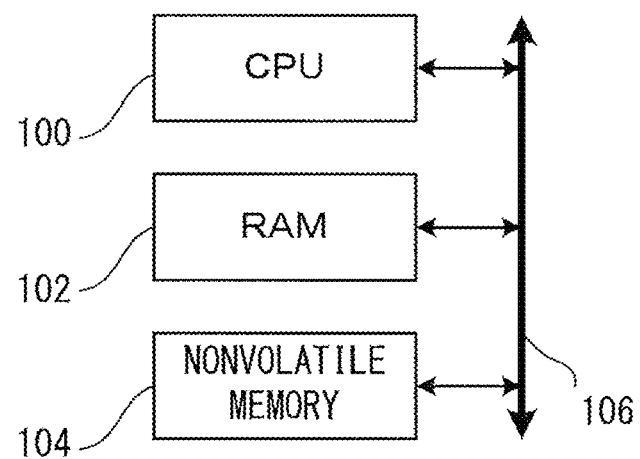
FIG. 6 is a hardware block diagram that illustrates a configuration of, for example, a CPU in the image capturing apparatus.

The functionality of the controller 30 is provided by a CPU into which a control program has been read, executing the program to perform software processing. FIG. 6 is a hardware block diagram that illustrates a configuration of, for example, a CPU in the image capturing apparatus 1. The functionalities of, for example, the color analysis section 31, the color correction instructing section 32, the analysis range indicating section 33, and the image generator 50 may also be provided by a CPU 100 performing software processing. Conversely, the controller 30 may be configured by hardware.

The CPU 100 is connected to a RAM 102 and a nonvolatile memory 104 through a bus 106. The RAM 102 is a working area in which a read program is temporally stored. The RAM 102 is a dynamic random access memory (DRAM) or the SDRAM 20. The nonvolatile memory 104 is a nonvolatile memory that stores a control program and various tables. The nonvolatile memory 104 is, for example, a flash memory.

FIG. 7 is a flowchart that illustrates a procedure of special image-processing when photographing is performed in a low illumination condition. The processing in FIG. 7 is performed by, for example, the controller 30, the color analysis section 31, the color correction instructing section 32, the analysis range indicating section 33, and the image generator 50. The color analysis section 31, the color correction instructing section 32, the analysis range indicating section 33, and the image generator 50 perform respective processes by being controlled by the controller 30.

The controller 30 detects a power-on manipulation that a photographer has performed using the manipulation section 80, and powers on the image capturing apparatus 1 (Step S10). The image capturing section 10 captures an image of a subject (Step S12). The image input section 55 may read captured-image data stored in the memory 60 instead of data of an image captured by the image capturing section 10. Further, the image input section 55 may input captured-image data from the outside of the image capturing apparatus 1 using a communication device.

The controller 30 performs special image-processing when one of the conditions in Steps S14 to S22 below is satisfied. The controller 30 determines whether captured-image data has been color-analyzed (Step S14). The controller 30 determines whether a flag indicating "color-analyzed" (C flag) is 1. The flag indicating "color-analyzed" is a flag indicating whether color analysis has been performed, and is stored in the SDRAM 20. The flag indicating "color-analyzed" (C flag) is 1 when color analysis has been performed.

The controller 30 determines whether a live view image is displayed at a frame rate that is not less than a predetermined frame rate (Step S16). The predetermined frame rate is, for example, 30 fps.

The controller 30 determines whether an enlarged display is set (Step S18). The enlarged display is set by the manipulation section 80 with a digital zoom. The enlarged display is performed by the image generator 50, wherein color noise may be increased due to digital zoom processing.

The controller 30 determines whether an environmental brightness is low (Step S20). The controller 30 determines the environmental brightness according to a result of a detection performed by the environmental brightness detector 40. For example, when the BV is not greater than −4, the controller 30 determines that the environmental brightness is low, that is, that photographing is performed in a low illumination condition.

The controller 30 determines whether a remaining battery life is short (Step S22). The controller 30 performs the determination according to a result of a detection performed by the remaining battery life detector 42. For example, the controller 30 determines that the remaining battery life is short when the remaining battery life detector 42 has detected that the remaining battery life is not greater than 50%. This determination is performed in order to simplify noise reduction processing so as to reduce power consumption. The noise reduction processing consumes more power than the special image-processing, so it is preferable that the noise reduction processing be simplified when the remaining battery life is short. In other words, when the remaining battery life becomes short, the noise reduction processing that consumes more power is simplified, and the special image-processing is performed to compensate for it.

When all of the determinations of Steps S14 to S22 above are "NO", the controller 30 performs usual image-processing to display a live view image (Step S24). When one of the determinations of Steps S14 to S22 above is "YES", the controller 30 performs special image-processing to display a live view image (Step S26).

Figure 8:
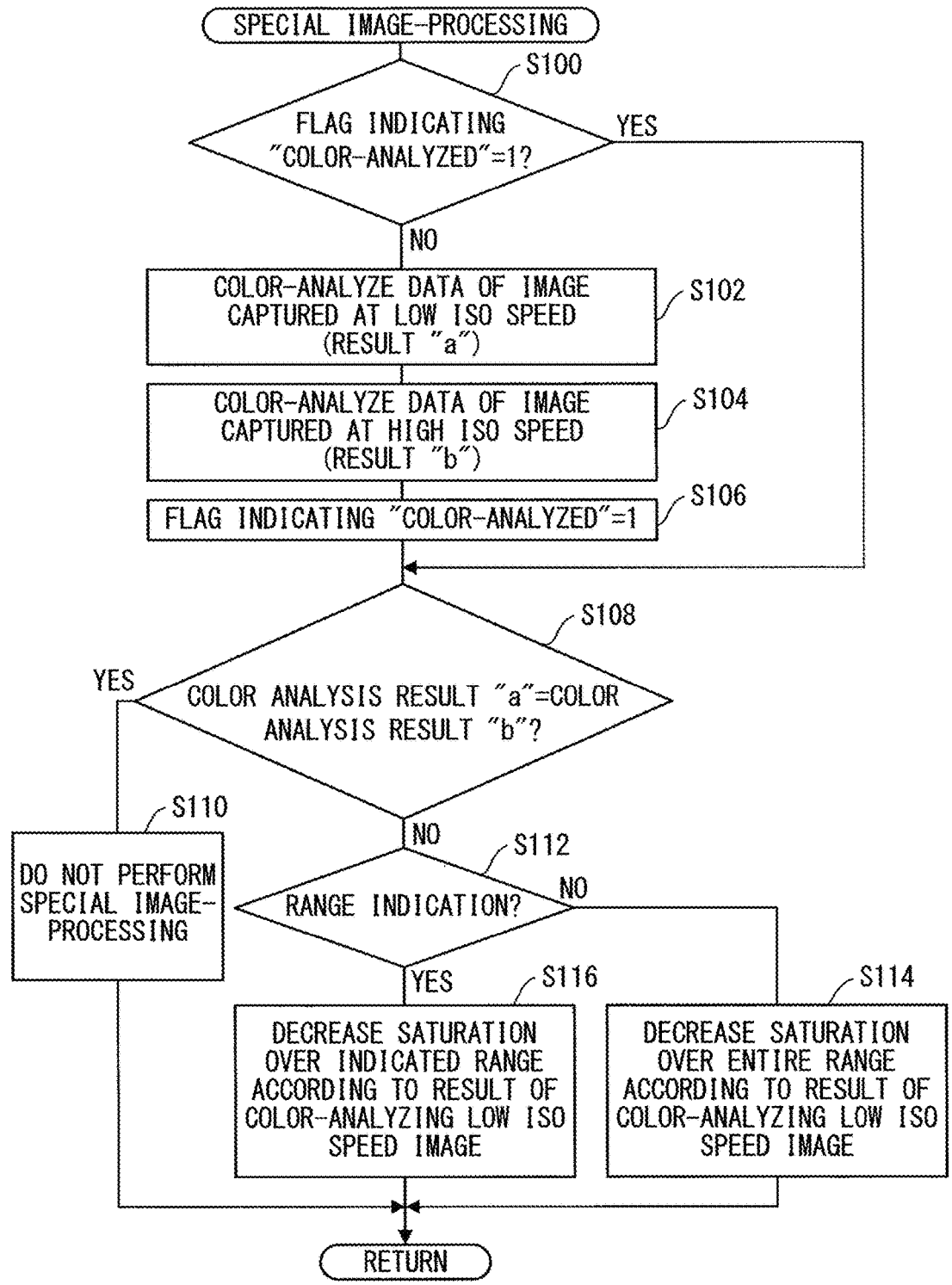
FIG. 8 illustrates a subroutine for explaining a procedure of special image-processing.

FIG. 8 illustrates a subroutine for explaining a procedure of special image-processing. The controller 30 determines whether a flag indicating "color-analyzed" is 1 (Step S100). When the controller 30 has determined that the flag indicating "color-analyzed" is not 1, that is, when it is 0 (NO in Step S100), the process moves on to Step S102. The flag indicating "color-analyzed" is 0 when color analysis has not been performed.

The controller 30 controls the image capturing section 10 to capture an image at a low ISO speed, causes the color analysis section 31 to color-analyze data of the image captured at a low ISO speed, and obtains an analysis result that is a result "a" (Step S102). The low ISO speed is, for example, ISO200. Thus, it takes a long time to perform photographing. The data of an image captured at a low ISO speed corresponds to the first captured-image data described above (also referred to as the low ISO speed image). The image of the first captured-image data has less color noise due to a low ISO speed and a long photographing time. Further, when a photographer indicates a range in which special image-processing is to be performed, the color analysis section 31 also color-analyzes a range in a low ISO speed image that is indicated by the analysis range indicating section 33.

Figure 9:
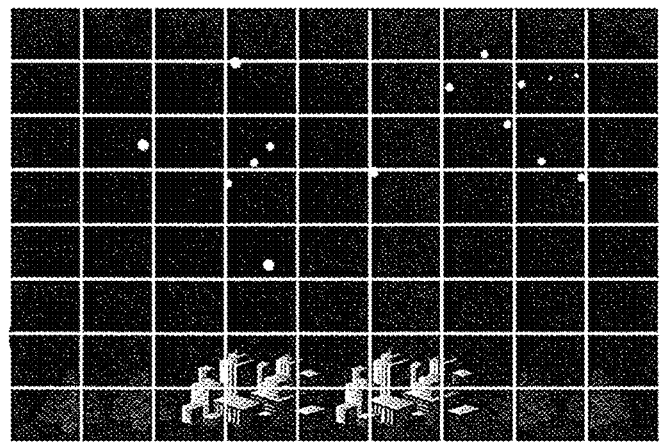
FIG. 9 is a diagram for explaining a result of color-analyzing a low ISO speed image.

FIG. 9 is a diagram for explaining a result of color-analyzing a low ISO speed image. An image D3 in FIG. 9 is a low-ISO-speed (low-frame-rate) live view image displayed on the display 70. It is an image of stars photographed as a subject. The vertical lines and the horizontal lines on the live view image are lines for dividing the image into blocks. The color analysis section 31 divides the image into a plurality of blocks, and calculates a color that is representative of each block using an average colorimetric value of each block. Here, an example of dividing an image into 72 blocks with eight in the vertical direction and nine in the horizontal direction is described. The lines that form blocks are not displayed on the live view image. The block division of eight in the vertical direction and nine in the horizontal direction is just an example.

The color analysis section 31 refers to, for example, the table T1 in FIG. 5, so as to calculate a color for each block. A calculated color for each block is displayed on a map M3 in FIG. 9. Here, it is assumed that Or (orange), PB (purple blue), B (blue), Cb (green blue), and G (green) have been detected as colors for the blocks. For example, B (blue) has been detected as a color for a block on the top left corner, and G (green) has been detected as a color for a block on the bottom left corner. A table T3 in FIG. 9 is a table in which a total number of blocks for which a color has been calculated is given for each color. This table T3 corresponds to the result "a". The color analysis section 31 stores the result "a" in the SDRAM 20.

The result "a" may only include only the top three colors in number of blocks (Cb, PB, and B in the table T3) by deleting, from the result "a", G and Or whose total number of blocks is smaller. Alternatively, the result "a" may only include colors whose total number of blocks is three or more by deleting Or from the result "a".

Next, the controller 30 controls the image capturing section to perform photographing at a high ISO speed while maintaining a usual frame rate (for example, 30 fps), and causes the color analysis section 31 to color-analyze data of an image captured at a high ISO speed (Step S104). The high ISO speed is, for example, ISO25600. The data of an image captured at a high ISO speed is also referred to as a high ISO speed image or the second captured-image data described above. The second captured-image data is obtained by performing photographing at a high ISO speed and at a usual frame rate, so its image has much color noise. It is assumed that the difference in photographing time between photographing at a low ISO speed and photographing at a high ISO speed is sufficiently small, such as not greater than one second. This is because a color comparison is not properly performed if subjects of images to be compared are not the same. Further, as in Step S102, when a photographer indicates a range in which special image-processing is to be performed, the color analysis section 31 also color-analyzes a range in a high ISO speed image that is indicated by the analysis range indicating section 33.

Figure 10:
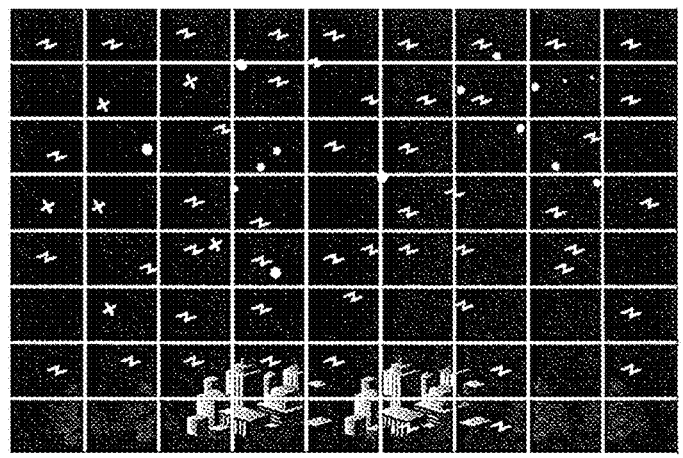
FIG. 10 is a diagram for explaining a result of color-analyzing a high ISO speed image.

FIG. 10 is a diagram for explaining a result of color-analyzing a high ISO speed image. An image D4 in FIG. 10 is a high-ISO-speed live view image displayed on the display 70, and is an image on which special image-processing has not been performed (that is, it is an image having much color noise). The block size into which an image is divided is the same as in FIG. 9.

A color calculated by the color analysis section 31 for each block is displayed on a map M4 in FIG. 10. Here, it is assumed that, in addition to Or (orange), PB (purple blue), B (blue), Cb (green blue), and G (green), R (red), RP (red purple), and GY (yellow green) have been calculated as colors for the blocks. In other words, the result "a" does not include three colors, R (red), RP (red purple), and GY (yellow green). A table T4 in FIG. 10 is a table in which a total number of blocks for which a color has been calculated is given for each color. This table T4 corresponds to the result "b". The color analysis section 31 stores the result "b" in the SDRAM 20.

The result "b" may only include only the top three colors in number of blocks (RP, GY, and R in the table T4) by deleting, for example, B from the result "b". Alternatively, the result "b" may only include colors whose total number of blocks is three or more by deleting PB and Or from the result "b".

After the color analysis is completed, the controller 30 sets a flag indicating "color-analyzed" to be 1 because color analysis has been performed (Step S106), and the process moves on to Step S108. Further, when the controller 30 has determined that the flag indicating "color-analyzed" is 1 (YES in Step S100), the process moves on to Step S108.

The color analysis section 31 compares and matches color analysis results so as to determine whether the result "a" is the same as the result "b" (Step S108). The color analysis section 31 outputs a comparison-and-matching result to the controller 30. When color noise in the high ISO speed image is not more than that in the low ISO speed image, the result "a" is the same as the result "b".

When the color analysis section 31 has determined that the result "a" is the same as the result "b" (YES in Step S108), the controller 30 determines that not very much color noise has occurred also in the high ISO speed image, and does not perform special image-processing (Step S110), but usual image-processing. After Step S110, the process of the controller 30 returns to Step S30 of FIG. 7.

When the color analysis section 31 has determined that the result "a" is not the same as the result "b" (NO in Step S108), the controller 30 determines that much color noise has occurred due to photographing at a high ISO speed, and performs special image-processing. The controller 30 determines whether a range in which special image-processing is to be performed has been indicated (Step S112). The range for special image-processing is preset by a photographer using the manipulation section 80, and color analysis and color correction are performed on the set range.

When the controller 30 has determined that the range has not been indicated (NO in Step S112), the controller 30 performs correction over an entire range of a screen of the data of an image captured at a high ISO speed, by decreasing a saturation over the entire range according to the result of color-analyzing the low ISO speed image (Step S114). As described above, a conversion into grey or replacement may be performed as the correction.

Specifically, the controller 30 reads the result "a" from the SDRAM 20, and the color correction instructing section 32 outputs, to the image generator 50, an instruction to decrease a saturation of a color that is not included in the result "a". According to the instruction from the color correction instructing section 32, the image generator 50 performs correction over the entire range in the data of an image captured at a high ISO speed, by decreasing a saturation of a color that is not included in the result "a".

FIG. 11 is a diagram for explaining a pixel correction performed by the image generator 50. Each square portion in FIG. 11 is a certain region in a high ISO speed image, in which a color of a displayed pixel is depicted. In FIG. 11, one area is one pixel, and each pixel is a pixel on which an interpolation process has been performed by the image generator 50. As described above, the color analysis section 31 performs color analysis for each block that is constituted of a plurality of pixels, but the image generator 50 performs correction for each displayed pixel. Further, the correction in FIG. 11 is an example of a correction performed according to the result "a" described with reference to FIG. 9 and according to the result "b" described with reference to FIG. 10.

N1 in FIG. 11 indicates the high ISO speed image before correction. For example, in N1, a color of a pixel on the top left corner is RP (red purple), and a color of a pixel on the bottom left corner is G (green). As described in the example of FIG. 9, Or (orange), PB (purple blue), B (blue), Cb (green blue), and G (green) are colors detected in the low ISO speed image, so it is determined that pixels of these detected colors are not color noise pixels (displayed as a pixel "na"). The non-color-noise pixel "na" is surrounded by thin lines.

R (red), RP (red purple), and GY (yellow green) are colors not detected in the low ISO speed image, so it is determined that pixels of these colors are color noise pixels (displayed as a pixel "nb"). In N1 of FIG. 11, the color noise pixel "nb" is surrounded by thick lines. The color correction instructing section 32 instructs the image generator 50 to correct the pixel "nb".

N2 to N4 in FIG. 11 indicate the high ISO speed image N1 in which correction processing has been performed on its pixels. In N2, correction has been performed by the image generator 50 performing a saturation decrease. The image generator 50 decreases a saturation of a color of a color noise pixel "nb" to obtain a corrected pixel "nc", so as to generate a corrected image. The saturation decrease is to decrease a saturation level up to, for example, ⅕.

In N3, correction has been performed by the image generator 50 performing a conversion into grey. This is a conversion of a color of a color noise pixel into grey performed as special image-processing by the image generator 50. This special image-processing is performed because the conversion into grey also prevents color noise that occurs due to high ISO speed processing. The image generator 50 converts a color of a color noise pixel "nb" into grey to obtain a corrected pixel "nd", so as to generate a corrected image.

In N4, colors of pixels in a corrected image are indicated, the pixel colors being colors on which replacement processing has been performed by the image generator 50. This is replacement of a color of a color noise pixel with a color included in the low ISO speed image that is performed as special image-processing by the image generator 50. This special image-processing is performed because the replacement of a color of a color noise pixel with a color included in a low ISO speed image also makes color noise less noticeable. The image generator 50 replaces a color of a color noise pixel "nb" with, for example, "B" included in the low ISO speed image to obtain a corrected pixel "ne", so as to generate a corrected image. The configuration may be made such that a photographer can select which of a saturation decrease, a conversion into grey, and replacement is to be performed as special image-processing.

FIG. 12 is a diagram for explaining an effect of special image-processing performed on a live view image. An image D10 is a live view image (high ISO speed image) before special image-processing is performed, and an image D11 is the live view image (high ISO speed image) after the special image-processing is performed.

A table T5 in FIG. 12 is a table that concretely indicates a detected color noise. A color of the detected color noise is given in the table T5. An actual color is given in the column of "NOISE". The table T5 indicates that, for example, RP (red purple), GY (yellow green), and R (red) have been detected as color noise. When the table T5 is displayed on a portion of the image D10 or the image D11, a photographer can know specifically the color of color noise.

Return to FIG. 8. When the controller 30 has determined that an analysis range has been indicated (YES in Step S112), the controller 30 performs, using the image generator 50, correction in the indicted range by decreasing a saturation over the indicated range according to the result of the color analysis performed on the low ISO speed image by the color analysis section 31 (Step S116). As described above, the image generator 50 may perform a conversion into grey or may perform replacement on the indicated range as the correction.

Specifically, the controller 30 reads the result "a" from the SDRAM 20 and instructs the color correction instructing section 32 to give, to the image generator 50, an instruction to decrease a saturation of a color not included in the result "a". According to the correction instruction from the color correction instructing section 32, the image generator 50 performs correction in the indicated range in data of an image captured at a high ISO speed, by decreasing a saturation of a color not included in the analysis result "a", so as to generate a corrected image. The analysis range indicating section 33 indicates the set analysis range to the color correction instructing section 32.

FIG. 13 illustrates screens on which an analysis range is indicated. An image D12 is an example of a live view image before correction in which an analysis range L is indicated by the manipulation section 80. The analysis range L is indicated in the live view image. The analysis range indicating section 33 indicates the indicated analysis range L to the color analysis section 31. The color analysis section 31 performs color analysis in the analysis range L, and calculates the result "a" and the result "b".

An image D13 is an example of the live view image after correction. The analysis range indicating section 33 indicates the analysis range L to the image generator 50 as a range to be corrected. The image generator 50 performs a color noise correction in the analysis range L. The inside of the analysis range L is corrected and color noise is reduced within the analysis range L, and the outside of the analysis range L is not corrected and color noise remains unchanged outside of the analysis range L. In the image D13, the analysis range L indicated by broken lines is displayed just for explanation, and there is no need to actually display it.

After Step S114 or S116, the controller 30 returns to Step S30 of FIG. 7.

The controller 30 displays a live view image generated by the image generator 50 (Step S30). The controller 30 determines whether a photographing instruction has been given by the release button 80a being pressed down (Step S32). When the controller 30 has determined that the photographing instruction has been given (YES in Step S32), the controller 30 captures a still image (Step S34). When the controller 30 captures a still image, the controller 30 does not perform the special image-processing described above. For example, photographing at a low ISO speed for which a long photographing time is required is performed.

When the controller 30 has determined that no photographing instruction has been given (NO in Step S32), the controller 30 determines whether a power-off manipulation has been performed (Step S36). When the controller 30 has determined that no power-off manipulation has been performed (NO in Step S36), the process returns to Step S12. When the controller 30 has determined that the power-off manipulation has been performed (YES in Step S36), the controller 30 sets a flag indicating "color-analyzed" stored in the SDRAM 20 to be 0, so as to reset the flag (Step S38). Further, the controller 30 also resets the result "a" and the result "b" stored in the SDRAM 20. The controller 30 turns off power (Step S40) and terminates the control processing.

In the flowcharts in FIGS. 7 and 8, it is assumed that the photographing environment remains unchanged and special image-processing continues to be performed until the power is turned off, in order to simplify descriptions. For example, the flag indicating "color-analyzed" may be reset to 0 when a predetermined time period has elapsed, so that switching between usual image-processing and special image-processing is performed according to the change in the process of photographing that occurs between Step S16 and Step S22. Further, processing that includes detecting the change that occurs between Step S16 and Step S22 and switching from special image-processing to usual image-processing may be included after Step S14.

In Step S108 of FIG. 8, the processing of comparing a result "a" with a result "b" is performed, but there is no need to perform the processing of comparing a result "a" with a result "b". With respect to a displayed pixel color for a high ISO speed image that is not included in a result "a" (a color other than the colors in the table T3 in the example of FIG. 9), the color correction instructing section 32 may instruct the image generator 50 to decrease a saturation of the displayed pixel color (or to perform a conversion into grey or to perform replacement). In this case, there is no need to color-analyze the high ISO speed image in Step S104.

Modification

The special image-processing described above can be performed by an apparatus other than the image capturing apparatus. FIG. 14 illustrates a configuration of an image processing apparatus 200 that performs the special image-processing described above. The image processing apparatus 200 includes the SDRAM 20, the controller 30, the color analysis section 31, the color correction instructing section 32, the analysis range indicating section 33, the environmental brightness detector 40, the remaining battery life detector 42, the image generator 50, the image input section 55, the memory 60, and an input/output interface (IF) 210. The SDRAM 20 to the memory 60 have the same functions as those described with reference to the block diagram of FIG. 2, so their descriptions are omitted. The input/output IF 210 performs data communication between the image processing apparatus 200 and a peripheral device, and, for example, is defined in the universal serial bus (USB) standards. The image capturing section 10, the display 70, and the manipulation section 80 may be connected as peripheral devices.

Further, the image processing apparatus 200 includes the CPU 100 and the other components described with reference to FIG. 5. The functionalities of the controller 30, the color analysis section 31, the color correction instructing section 32, the analysis range indicating section 33, and the image generator 50 are provided by the CPU 100 into which a control program has been read performing software processing.

The image capturing apparatus 1 described above (including the image processing apparatus 200) can easily perform framing even in a low illumination condition because a live view image captured at a high ISO speed in which color noise has been reduced is displayed.

The image capturing apparatus 1 determines, as color noise, a color that is not detected in a low ISO speed image, and corrects the color determined to be color noise in a high-ISO speed image, so it is possible to display, without damaging an actual image of a subject, a live view image in which color noise has been reduced.

Further, a color noise correction, such as decreasing a saturation of a color of a color noise pixel, or converting the color of a color noise pixel into grey, or replacing the color of a color noise pixel with a color in a low ISO speed image, is performed, so it is possible to reduce color noise that interferes with framing, by just performing simple processing.

Furthermore, color noise can be reduced only in a necessary range because it is also possible to set a range to be corrected.

In other words, it is often the case that framing is not performed smoothly when a black-and-white live view image is captured or a live view image is binarized as proposed in, for example, Patent Document 1 or 2. On the other hand, a live view image with color noise causes stress for a photographer. In particular, it is difficult to distinguish color noise from stars when astrophotographing is performed, so a live view image with much color noise is a great obstacle to framing. The embodiments described above can provide an image capturing apparatus that displays a live view image with less noise even when the live view image is captured at a high ISO speed.

Note that the present invention is not limited exactly to the above embodiments, and can be embodied in the implementation phases by modifying constitutional elements without departing from the spirit of the present invention. Also, it is possible to form various inventions by an appropriate combination of a plurality of constituent elements disclosed in the above embodiments. For example, all the constituent elements disclosed in the above embodiments may be combined appropriately. Further, constituent elements selected from different embodiments may be combined appropriately. It is as a matter of course that these various modifications and applications are possible without departing from the spirit of the present invention.

EXPLANATIONS OF LETTERS OR NUMERALS 1 image capturing apparatus
10 image capturing section
11 lens section
12 imaging element
13 signal processor
14 AD conversion section
15 AE section
16 AF section
17 lens driving section
18 element driving section
20 SDRAM
30 controller
31 color analysis section
32 color correction instructing section
33 analysis range indicating section
40 environmental brightness detector
42 remaining battery life detector
50 image generator
55 image input section
60 memory
70 display
80 manipulation section
90 ASIC

What is claimed is:

1. An image capturing apparatus comprising:
an image capturing section that performs special image-processing that includes performing photographing twice at different ISO speeds and outputting first captured-image data obtained by capturing an image at a relatively low ISO speed, and second captured-image data obtained by capturing an image at an ISO speed higher than the ISO speed for the first captured-image data;
a color analysis circuit that analyzes a display color included in a display image of the first captured-image data;
a color correction instructing circuit that gives an instruction to correct a display color of the second captured-image data according to a result of the analysis performed by the color analysis circuit;
an image generation circuit that corrects the display color of the second captured-image data according to the correction instruction given by the color correction instructing circuit, so as to generate an image to be displayed that is based on the second captured-image data; and
a display that displays the image to be displayed that has been generated by the correction performed by the image generation circuit.

2. The image capturing apparatus according to claim 1, wherein
the color correction instructing circuit instructs the image generation circuit to correct a display color of the second captured-image data that is not included in the first captured-image data.

3. The image capturing apparatus according to claim 1, wherein
the color correction instructing circuit gives an instruction to perform correction by decreasing a saturation of a display color of the second captured-image data that is not included in the first captured-image data.

4. The image capturing apparatus according to claim 1, wherein
the color correction instructing circuit gives an instruction to perform correction by converting, into grey, a display color of the second captured-image data that is not included in the first captured-image data.

5. The image capturing apparatus according to claim 1, wherein the color correction instructing circuit gives an instruction to perform correction by replacing a display color of the second captured-image data that is not included in the first captured-image data with a display color that is included in the first captured-image data.

6. The image capturing apparatus according to claim 1 comprising a controller that controls the color analysis circuit, wherein in addition to the color analysis of the first captured-image data, the color analysis circuit color-analyzes the second captured-image data, matches display colors respectively obtained by the analyses performed on the first captured-image data and performed on the second captured-image data, and outputs a matching result, and the controller determines, according to the matching result, whether to cause the color correction instructing circuit to give a correction instruction.

7. The image capturing apparatus according to claim 1, wherein the color analysis circuit divides captured-image data into a plurality of blocks, and analyzes a display color of the captured-image data on the basis of a display color detected for each of the blocks obtained by the division.

8. The image capturing apparatus according to claim 1 comprising an analysis range indicating circuit that indicates, to the color analysis circuit, an analysis range in the captured-image data in which analysis is to be performed.

9. The image capturing apparatus according to claim 1 comprising a controller that selectively causes the image capturing section to perform the special image-processing, wherein the controller causes the image capturing section to perform the special image-processing when a live view image is displayed.

10. The image capturing apparatus according to claim 1 comprising:

a controller that selectively causes the image capturing section to perform the special image-processing; and an environmental brightness detector that detects a brightness in an environment in which photographing is performed, wherein when the environmental brightness detector has detected that photographing is performed in a dark environment, the controller causes the image capturing section to perform the special image-processing.

11. The image capturing apparatus according to claim 1 comprising:

a controller that selectively causes the image capturing section to perform the special image-processing; and a remaining battery life detector that detects a remaining battery life, wherein when an amount of the detected remaining battery life has become smaller than a preset value, the controller causes the image capturing section to perform the special image-processing.

12. The image capturing apparatus according to claim 1 comprising a controller that selectively causes the image capturing section to perform the special image-processing, wherein when an enlarged display is performed on the display or when a fast display is performed on the display, the controller causes the image capturing section to perform the special image-processing.

13. An image processing apparatus comprising:

a color analysis circuit that analyzes a display color included in a display image that is displayed using captured-image data, wherein the color analysis circuit analyzes display colors of first captured-image data, and determines a display color of the first captured-image data that is included in display colors of second captured-image data obtained by capturing an image at an ISO speed higher than the ISO speed for the first captured-image data;

a color correction instructing circuit that gives an instruction to correct a display color of the second captured-image data according to a result of the analysis performed by the color analysis circuit;

an image generation circuit that corrects the second captured-image data according to the correction instruction, so as to generate an image to be displayed; and a display that displays the generated image to be displayed.

14. A computer-readable non-transitory storage medium storing a program for causing a computer to perform image processing, the program comprising:

analyzing a display color included in a display image that is displayed using captured-image data, wherein the analyzing of the display color includes analyzing display colors of first captured-image data, and determining a display color of the first captured-image data that is included in display colors of second captured-image data obtained by capturing an image at an ISO speed higher than the ISO speed for the first captured-image data;

giving an instruction to correct a display color of the second captured-image data according to a result of the analyzing of the display color;

correcting the second captured-image data according to the correction instruction and generating an image to be displayed; and outputting the generated image to be displayed to a display.

* * * * *